(12) United States Patent
Goto (10) Patent No.: US 8,792,644 B2
(45) Date of Patent: Jul. 29, 2014

(54) COMMUNICATION APPARATUS FOR PERFORMING COMMUNICATION PARAMETER SETTING AND AUTHENTICATION PROCESS, CONTROL METHOD THEREOF AND STORAGE MEDIUM STORING PROGRAM

(75) Inventor: Fumihide Goto, Naka-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 382 days.

(21) Appl. No.: 12/812,024

(22) PCT Filed: Mar. 4, 2009

(86) PCT No.: PCT/JP2009/054596
§ 371 (c)(1),
(2), (4) Date: Jul. 7, 2010

(87) PCT Pub. No.: WO2009/116433
PCT Pub. Date: Sep. 24, 2009

(65) Prior Publication Data
US 2010/0278343 A1 Nov. 4, 2010

(30) Foreign Application Priority Data

Mar. 17, 2008 (JP) ................................. 2008-068354

(51) Int. Cl.
*H04K 1/00* (2006.01)
(52) U.S. Cl.
USPC ........................................................ 380/270
(58) Field of Classification Search
CPC ..... H04W 84/20; H04W 12/06; H04W 12/08; H04L 63/08; H04L 12/18; H04L 9/08
USPC ........................................................ 380/270
See application file for complete search history.

(56) References Cited

U.S. PATENT DOCUMENTS

| 7,555,056 B2 | 6/2009 | Hara et al. |
| 7,720,477 B2 | 5/2010 | Moritomo et al. |
| 7,849,150 B2 | 12/2010 | Loeebbert et al. |

(Continued)

FOREIGN PATENT DOCUMENTS

| JP | 2004-129042 A | 4/2004 |
| JP | 2004-228927 A | 8/2004 |

(Continued)

OTHER PUBLICATIONS

Varadharajan et al. "Security for cluster based ad hoc networks" Computer Communications 27 (2004) pp. 488-501.*

(Continued)

*Primary Examiner* — Harunur Rashid
(74) *Attorney, Agent, or Firm* — Fitzpatrick, Cella, Harper & Scinto (57) ABSTRACT

When a wireless network is constructed, a wireless communication apparatus in the wireless network constructed of a plurality of communication apparatuses decides whether to function as a providing source of communication parameters or as a provision destination that receives communication parameters. In a case where it has been decided that this apparatus is to function as the provision destination that receives communication parameters, the apparatus requests authentication when it participates in the wireless network using communication parameters. In a case where it has been decided that this apparatus is to function as the providing source of communication parameters, the apparatus execute authentication processing in response to an authentication request.

12 Claims, 7 Drawing Sheets

(56) References Cited

U.S. PATENT DOCUMENTS

| | | |
|---|---|---|
| 8,248,961 B2 | 8/2012 | Fujii ............................ 370/252 |
| 2002/0147819 A1* | 10/2002 | Miyakoshi et al. ........... 709/228 |
| 2004/0235485 A1 | 11/2004 | Tanaka |
| 2006/0036856 A1* | 2/2006 | Kok ............................. 713/168 |
| 2006/0246947 A1* | 11/2006 | Fujii et al. .................... 455/557 |
| 2008/0045181 A1* | 2/2008 | Suzuki .......................... 455/411 |
| 2009/0063851 A1* | 3/2009 | Nijdam ......................... 713/155 |
| 2010/0046394 A1 | 2/2010 | Fujii et al. |
| 2010/0203825 A1 | 8/2010 | Goto |
| 2010/0220605 A1* | 9/2010 | Fujii ............................ 370/252 |
| 2010/0234056 A1 | 9/2010 | Goto |

FOREIGN PATENT DOCUMENTS

| | | |
|---|---|---|
| JP | 2006309458 A | 11/2006 |
| JP | 2006311138 A | 11/2006 |
| JP | 2007-251922 | 9/2007 |
| JP | 2007-329577 A | 12/2007 |
| WO | 2007094512 A1 | 8/2007 |
| WO | WO 2007094512 A1 * | 8/2007 |

OTHER PUBLICATIONS

Varadharajan, et al., "Security for cluster based ad hoc networks", Computer Communications 27 (2004), pp. 488-501.

Persson, et al., "Secure Connections in Bluetooth Scatternets", Proceedings of the 36th Hawaii International Conference on System Sciences (2003).

Motonori Shindo, "This is a True Wireless LAN!", Network World, IDG, Japan, vol. 10, No. 5, pp. 82-92, May 2005, with English Translation.

Japanese Office Action dated Nov. 19, 2012 in corresponding Japanese Patent Application No. 2008-068354.

* cited by examiner

COMMUNICATION APPARATUS FOR PERFORMING COMMUNICATION PARAMETER SETTING AND AUTHENTICATION PROCESS, CONTROL METHOD THEREOF AND STORAGE MEDIUM STORING PROGRAM

TECHNICAL FIELD

The present invention relates to a communication apparatus and control method in a network constructed by a plurality of communication apparatuses.

BACKGROUND ART

Conventionally, communication parameters when implementing a wireless LAN connection based upon the so-called. IEEE 802.11 standard, such as IEEE 802.11a/b/g/n/i, are large in number and there are many variations of set values. Accordingly, methods for simplifying the setting of communication parameters have been proposed.

In a network in an infrastructure mode having a specific base station, the wireless communication apparatuses constituting the network are managed by the base station. For this reason, the communication parameters for configuring the network are distributed from the base station to the wireless communication apparatuses.

In a network in the ad-hoc mode that does not possess a specific base station, all wireless communication apparatuses are on an equal footing. This necessitates a technique for deciding which wireless communication apparatus will be the source of the communication parameters. Such a technique for deciding the source that provides communication parameters has been proposed (e.g., see the specifications of Japanese Patent Application Laid-Open Nos. 2006-309458 and 2006-311138).

However, in a case where WPA (Wi-Fi Protected Access), etc., which is a wireless LAN encryption standard, has been selected as a security setting for communication parameters, the start-up direction of a key-sharing algorithm must be set as connection authentication processing separate from the direction in which communication parameters are provided.

Accordingly, a problem which remains is that in the case of a network in the ad-hoc mode not having a specific base station in which all wireless communication apparatuses are on an equal footing, which wireless communication apparatus is to execute connection authentication processing must be decided.

DISCLOSURE OF INVENTION

The present invention is such that a communication apparatus that has been discriminated as the providing source of communication parameters or as the destination thereof executes authentication processing as the authenticating side or authenticated side in accordance with the communication apparatus discriminated.

In accordance with an aspect of the present invention, there is provided a communication apparatus in a communication network in which communication apparatuses communicate directly without the intermediary of a base station, comprising: a determination unit that determines, by a prescribed protocol, whether this apparatus is to function as a providing source of communication parameters for forming the communication network or as a provision destination that receives communication parameters; and a decision unit that, in a case where it has been determined by the determination unit that this apparatus is to function as the provision destination that receives communication parameters, decides that this apparatus will function as a supplicant that requests a communicating-partner apparatus to perform authentication when encryption-key share processing is executed with the communicating-partner apparatus, and in a case where it has been determined by the determination unit that this apparatus is to function as the providing source of communication parameters, decides that this apparatus will function as an authenticator that executes authentication processing requested by the communicating-partner apparatus that functions as the supplicant.

In accordance with another aspect of the present invention, there is provided a processing method by a communication apparatus in a communication network in which communication apparatuses communicate directly without the intermediary of a base station, the method comprising: determining, by a prescribed protocol, whether this apparatus is to function as a providing source of communication parameters for forming the communication network or as a provision destination that receives communication parameters; and deciding that, in a case where it has been determined in the determining step that this apparatus is to function as the provision destination that receives communication parameters, this apparatus will function as a supplicant that requests a communicating-partner apparatus to perform authentication when encryption-key share processing is executed with the communicating-partner apparatus, and in a case where it has been determined in the determining step that this apparatus is to function as the providing source of communication parameters, this apparatus will function as an authenticator that executes authentication processing requested by the communicating-partner apparatus that functions as the supplicant.

Further features of the present invention will become apparent from the following description of exemplary embodiments with reference to the attached drawings.

BEST MODE FOR CARRYING OUT THE INVENTION

Preferred embodiments of the present invention will now be described in detail with reference to the drawings.

First Embodiment

Figure 1:
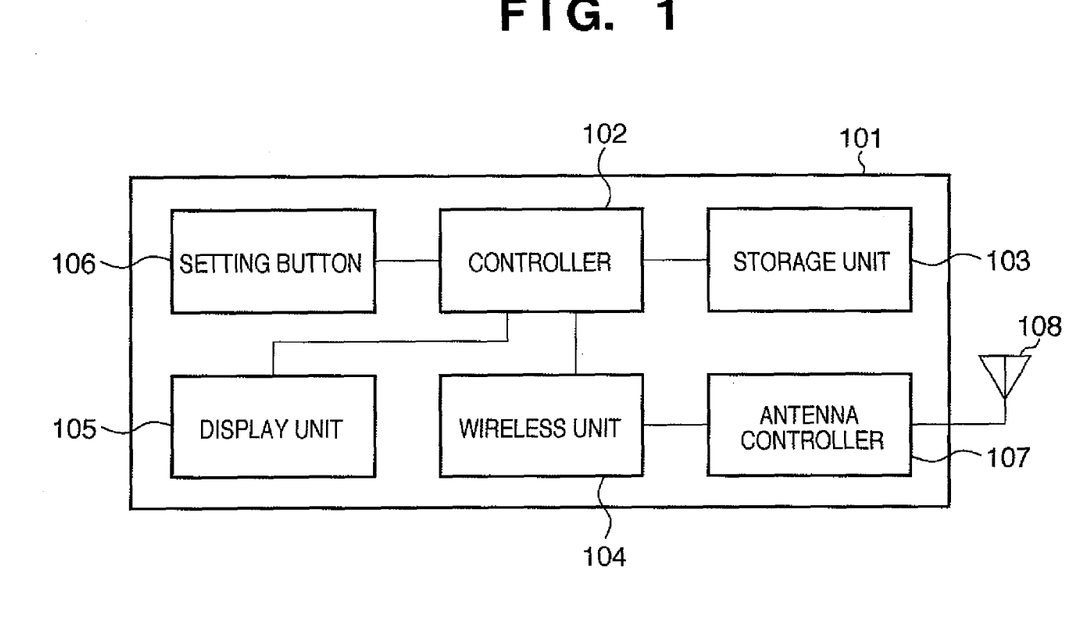
FIG. 1 is a block diagram illustrating the configuration of a wireless communication apparatus having an application for automatically setting communication parameters.

Described first will be a hardware configuration in a preferred embodiment for practicing the present invention. FIG.

1 is a block diagram illustrating the configuration of a wireless communication apparatus 101 having an application for automatically setting communication parameters. Communication parameters in this embodiment are a network identifier (SSID), an encryption key, an authentication scheme and a frequency channel, etc.

The wireless communication apparatus 101 includes a controller 102 for controlling the setting of communication parameters and for controlling a wireless function; a storage unit 103 for storing various information; a wireless unit 104 for performing wireless communication; a display unit 105 for presenting displays and the like has a function for outputting visually perceivable information in the manner of an LCD or LED and a function for outputting sound information in the manner of a speaker; a setting button 106 for applying a trigger that starts the setting of communication parameters; an antenna controller 107; and an antenna 108.

The foregoing is the hardware configuration of the wireless communication apparatus. It should be noted that this hardware configuration is one embodiment of the present invention and the apparatus need not necessarily having this particular Configuration. Any hardware configuration to which the spirit of the present invention is applicable falls within the scope of the present invention.

Figure 2:
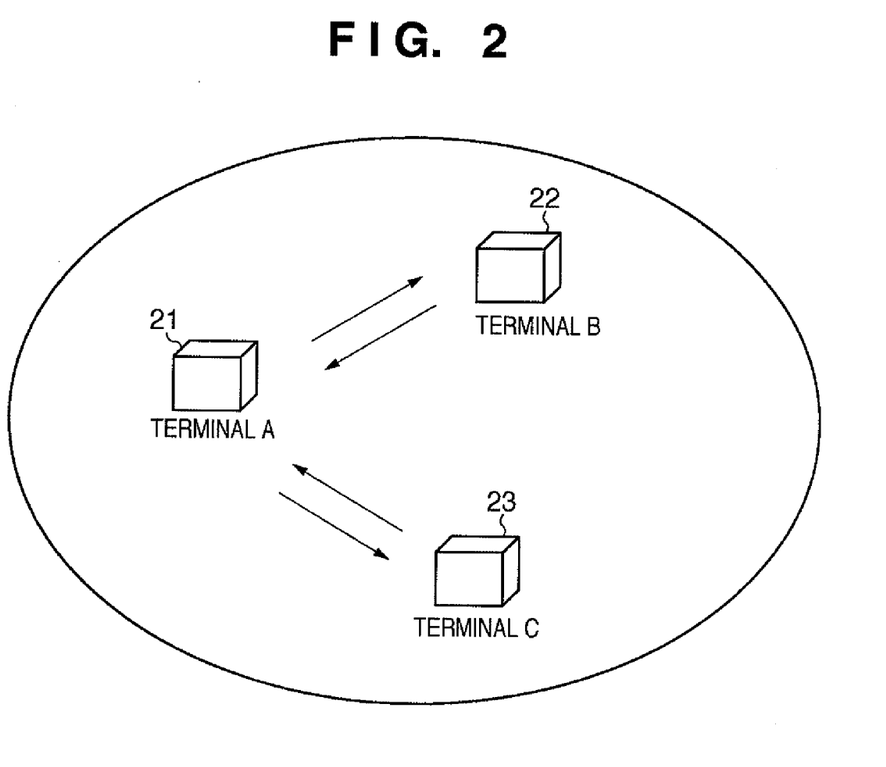
FIG. 2 is a diagram illustrating an example of the configuration of a network constituted by wireless communication apparatuses of the kind shown in FIG. 1.

FIG. 2 is a diagram illustrating an example of the configuration of a communication network constituted by wireless communication apparatuses of the kind shown in FIG. 1. As illustrated in FIG. 2, the network includes communication apparatuses 21, 22 and 23 (referred to as terminals A, B and C, respectively) having a wireless communication function of a wireless LAN compliant with the IEEE 802.11 standard.

The terminals A, B and C have the functions of the wireless communication apparatus shown in FIG. 1. All of these terminals have the same wireless communication capability and construct a network that operates in the ad-hoc mode. The ad-hoc mode refers to a form of communication in which terminals communicate directly with one another without the intermediary of a base station (access point). After the ad-hoc-mode network is constructed, the roles played in communication-parameter setting processing (the terminal that is the source of provision of communication parameters and the terminals that are the destinations of the provided parameters) are decided based upon a predetermined algorithm for deciding the source of provision of communication parameters.

It should be noted that although the algorithm described in the specification of Japanese Patent Application Laid-Open No. 2006-311138 is capable of being used as the algorithm for deciding the source of provision of communication parameters, the present invention is not limited to this method. Here it is assumed that terminal A is decided as the terminal that is the source of provision of communication parameters and that terminals B and C are decided as the terminals that are the destinations of the provided parameters. The manner in which terminals B and C are provided with communication parameters from terminal A is illustrated in FIG. 2.

Figure 3:
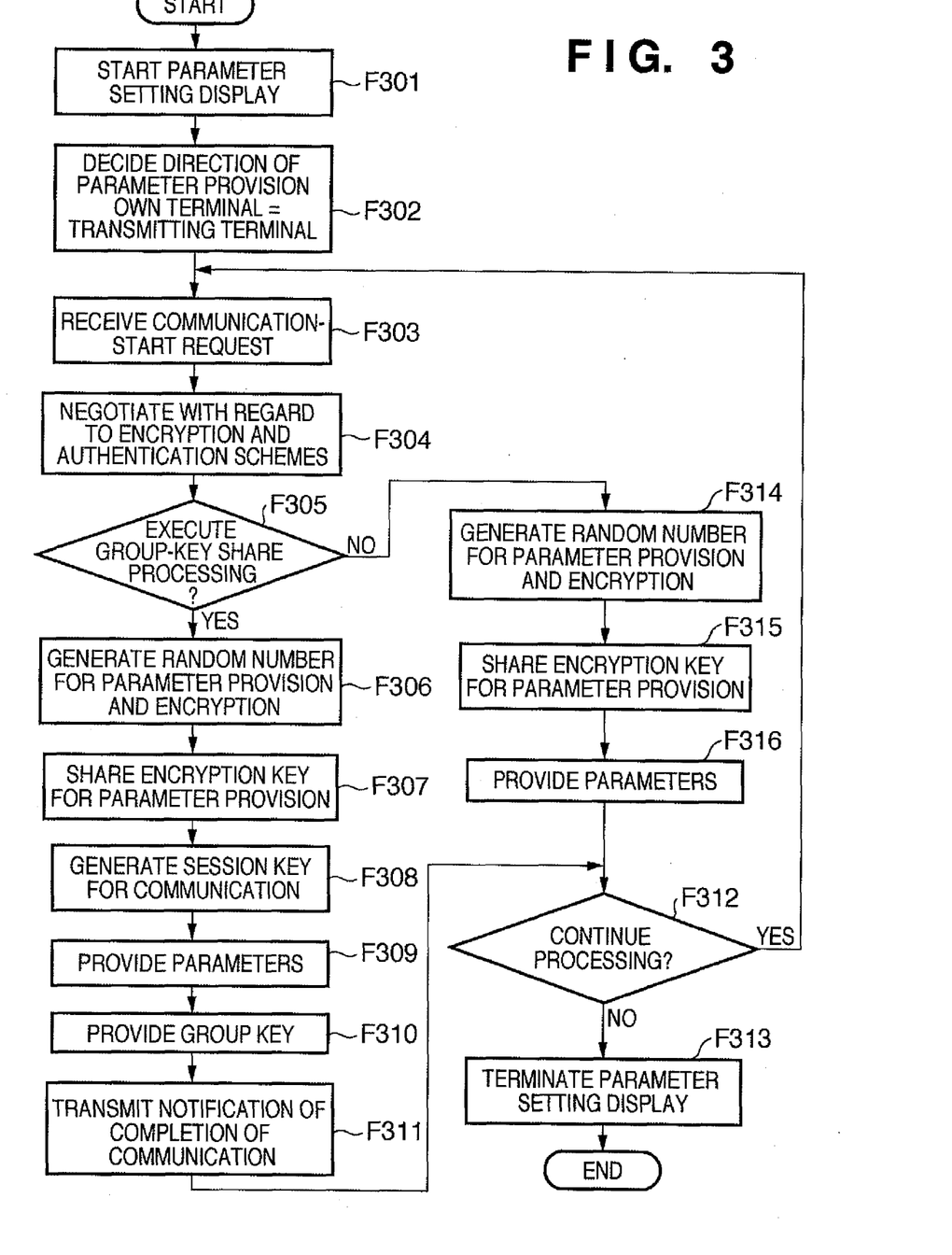
FIG. 3 is a flowchart for describing a communication control method executed by terminal A shown in FIG. 2.

FIG. 3 is a flowchart for describing a communication control method executed by terminal A shown in FIG. 2. First, the user presses the setting button 106 to thereby activate the function for setting communication parameters. More specifically, in order to indicate that the communication-parameter setting function of this terminal has been activated, terminal A assigns a specific identifier to beacon information used in a wireless LAN, by way of example. Further, in order to notify the user that the communication-parameter setting function has been activated, terminal A causes the display unit 105 to display "SETTING OF COMMUNICATION PARAMETERS IS IN PROGRESS", etc. (F301). User convenience is enhanced in this way.

Next, terminal A executes predetermined processing for deciding direction of provision of communication parameters, this being executed between itself and terminals B and C, which also have activated their communication-parameter setting function. It is assumed here that terminal A is decided by this processing as the terminal that is the source of provision of communication parameters (F302).

Next, terminal A decided upon as the terminal that is the source of provision of communication parameters receives a request to start provision (setting) of communication parameters as a communication-start request from terminal B or C decided upon as the terminal that is the destination of the provided parameters (F303).

Terminal A negotiates with the other party (e.g., terminal B) in regard to the encryption and authentication schemes used when data communication is performed after the setting of communication parameters (i.e., after construction of the network) (F304). Although there are several variations of encryption and authentication schemes used in wireless LANs, they can be classified broadly into two types. The first is for a case where an encryption key provided as a communication parameter from the terminal that is the source of provision of communication parameters is utilized as is as an encryption key for encrypting transmit data (this will be referred to as a "first encryption and authentication scheme").

The second is for a case where authentication processing is executed at the sending and receiving sides with an encryption key delivered as a communication parameter serving as a seed, a new session key is generated and the transmit data is encrypted using the session key (this will be referred to as a "second encryption and authentication scheme").

In both cases it is desired that the key for encrypting communication parameters at the time of provision of the communication parameters and the encryption key used in actual data communication after communication-parameter setting processing ends be different from each other.

It should be noted that in the IEEE 802.11i series, the first encryption and authentication scheme corresponds to that of the conventional WEP (Wired Equivalent Privacy) key and the second encryption and authentication scheme corresponds to that of TKIP or COMP. TKIP (Temporal Key Integrity Protocol) has a user authentication function, which is a function for preventing the altering of messages by making it possible to change the encryption key on a per-packet basis or periodically. COMP (Counter mode with Cipher block chaining Message authentication code Protocol) makes it possible to detect alteration of data.

In a case where the result of negotiation is such that a new session key is generated, group-key share processing also is executed between terminals. Accordingly, in the first embodiment, in order to distinguish the encryption and authentication scheme, whether group-key share processing is executed or not executed is adopted as the criterion (F305). In actuality, since which encryption and authentication scheme is used is decided by the above-mentioned negotiation, whether processing from F306 onward or processing from F314 onward is executed is decided based upon the encryption and authentication scheme decided.

It should be noted that in the description rendered in this embodiment, it is assumed that the above-mentioned determination is made based upon the negotiation regarding the encryption and authentication scheme. However, the determination may just as well be made based upon either the encryption scheme or the authentication scheme.

Here a session key is an encryption key mainly used in unicast. Different session keys may be used between the set of terminals A and B and the set of terminals A and C, or the same session key may be used.

A group key is an encryption key used in multicast communication and broadcast communication, and it is the same for all terminals (terminals A, B and C in this embodiment) that constitute the network. All communication may be performed using the group key, with the session key and group key being the same key.

Every terminal capable of being a source of packet transmission may have group keys. Since three terminals construct the network in this embodiment, each terminal may have three group keys each. Further, the network may have a unique group key.

Described first will be a case where a scheme for executing group-key share processing is adopted at the decision step F305.

In the case of the scheme for executing group-key share processing, it is necessary to decide the roles of terminals A and B in the connection authentication process (i.e., which terminal is on the side that authenticates the connection and which is on the side where the connection is authenticated). Here the terminal on the side that authenticates the connection will be referred to as the "authenticator" and that on the side authenticated will be referred to as the "supplicant".

In the first embodiment, by virtue of the processing for deciding the direction of provision of communication parameters, terminal A decided upon as the source terminal for provision of communication parameters becomes the authenticator that takes charge of the function on the connection authenticating side. Terminal B or C decided upon as the terminal that is the destination of provision of communication parameters becomes the supplicant that takes charge of the function on the connection-authenticated side.

With regard to the provision of communication parameters, encryption of the communication parameters and authentication processing between the parameter-source terminal and parameter-destination terminal are carried out in order to assure security. Accordingly, terminal A generates a random number necessary in order to execute encryption and authentication processing (F306). The random number generated is stored beforehand in order to be used as a random number employed in the generation of a session key.

Next, between itself and terminal B, terminal A executes encryption-key share processing and authentication processing for encrypting the communication parameters that it provides (F307). In the course of the processing at F307, a random number generated by terminal B necessary for encryption and authentication processing at the time of provision of communication parameters is transmitted from terminal B. By using the mutually generated random numbers, terminals A and B execute encryption-key share processing for provision of communication parameters.

As will be described later, terminal B uses an encryption key, which is shared with terminal A, in order to decrypt communication parameters provided to it. In other words, the encryption-key share processing here indicates execution of prescribed protocol processing between terminals A and B since terminal A has an encryption key for encrypting communication parameters that is provides and terminal B has an encryption key for decrypting communication parameters with which it is provided.

Next, a session key for communication is generated based upon the random number generated by terminal A, the random number generated by terminal B and the seed of the encryption key possessed by terminal A (F308).

Then, using the encryption key shared with the terminal B at F307, terminal A encrypts the communication parameters necessary for configuring an ad-hoc-mode network and transmits the encrypted communication parameters to terminal B (F309). At this time the session key generated at F308 also is transmitted. The session key is thus shared between terminals A and B. The processing for sharing the session key used in the description below is processing whereby terminal A transmits the generated session key to terminal B and terminal B receives the session key.

Even though the session key is transmitted to terminal B, a case where terminal B does not possess the functions necessary for the first embodiment is conceivable. In such case, terminal B glances at the session key transmitted from terminal A and executes processing in the conventional manner.

The session key transmitted at F309 is an encryption key valid when a unicast is performed between terminals A and B. Next, using the session key, terminal A encrypts a group key valid for all terminals that constitute the ad-hoc-mode network and transmits the encrypted group key to terminal B (F310). The group key is thus shared between terminals A and B. Thus, group-key share processing is processing whereby terminal A sends terminal B the group key encrypted using the session key and terminal B receives the encrypted group key. In the first embodiment, the group key is just transmitted to terminal B. However, in a case where terminal A has already executed communication-parameter setting processing between itself and other terminals, it executes group-key share processing with all terminals that have completed executing parameter setting processing.

At this point in time the communication parameters necessary for the wireless connection are complete. Accordingly, terminal A sends terminal B notification of completion of setting of communication parameters, which serves as notification of completion of communication (F311). At this time "CONNECTION TO WIRELESS NETWORK IS COMPLETE", etc., is displayed on the display unit 105. This enhances user convenience.

Communication over the ad-hoc-mode network is established between terminals A and B by the processing described above.

Next, terminal A determines whether processing for setting communication parameters is to be continued and provision of communication parameters to another terminal is to be performed (F312). If continuation is determined, then the processing flow is executed between terminal A and the other terminal from F303 onward. If non-continuation is determined, then terminal A terminates the display indicating that the parameter setting function activated at F301 is valid (F313).

Described next will be a case where a scheme for executing group-key share processing is not adopted at the decision step F305.

In the case of a scheme in which group-key share processing is not executed, it will suffice if the encryption key provided from terminal A to terminal B as a communication parameter is applied as is That is, it is not particularly necessary to decide which of terminals A and B is on the side that authenticates the connection and which is on the side where the connection is authenticated in the connection authentication process. With regard to the provision of communication parameters, encryption of the communication parameters and authentication processing between the parameter-source terminal and parameter-destination terminal are carried out. Here terminal A generates a random number necessary to execute this encryption and authentication processing (F314). Next, using the encryption key shared with terminal B at F315, terminal A encrypts the communication parameters necessary for configuring the ad-hoc-mode network and transmits the encrypted communication parameters toward terminal B (F316).

By virtue of the processing described above, communication-parameter setting processing in a case where group-key share processing is not executed is completed and the same communication parameters can be shared between terminals A and B. A network therefore can be constructed using these parameters.

Figure 4:
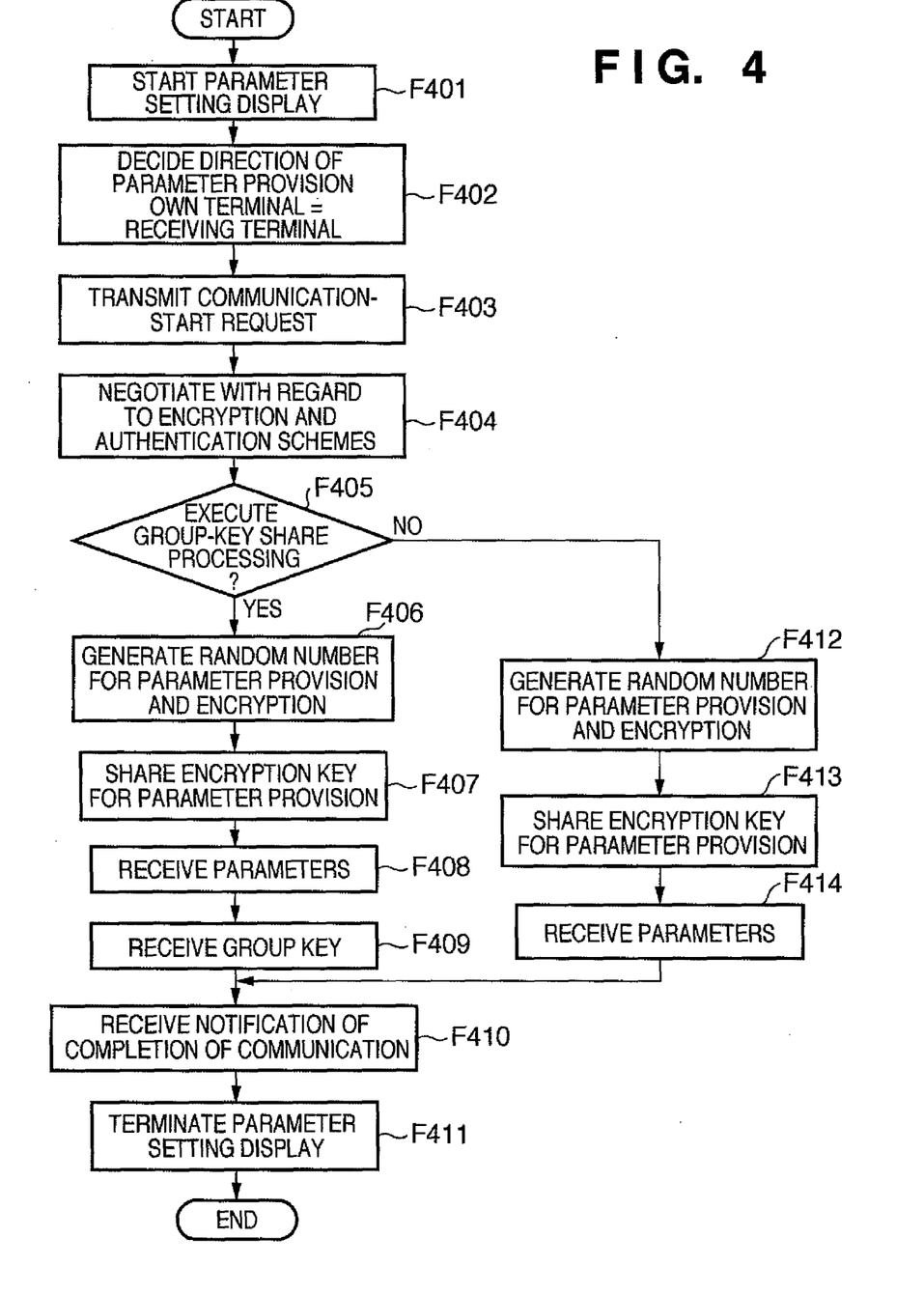
FIG. 4 is a flowchart for describing a method of controlling communication of terminal B or C shown in FIG. 2.

FIG. 4 is a flowchart for describing a method of controlling communication of terminal B or C shown in FIG. 2. Here the description will relate to terminal B.

First, in a manner similar to that of terminal A, the setting button 106 at terminal B is pressed to activate the function for setting communication parameters. As described above, in order to indicate that the communication-parameter setting function of this terminal has been activated, terminal B assigns a specific identifier to beacon information used in a wireless LAN, by way of example. Further, in order to notify the user that the communication-parameter setting function has been activated, terminal B causes the display unit 105 to display "SETTING OF COMMUNICATION PARAMETERS IS IN PROGRESS", etc. (F401). User convenience is enhanced in this way.

Next, terminal B executes predetermined processing for deciding direction of provision of communication parameters, this being executed between itself and terminals A and C, which also have activated their communication-parameter setting function. If it has been decided that terminal A is the terminal that is the source of provision of communication parameters, then terminal B is decided by this provision-direction decision processing as the terminal (receiving terminal) that is the destination of provision of the communication parameters (F402).

Next, terminal B decided upon as the communication-parameter receiving terminal by the provision-direction decision processing sends terminal A, which has been decided upon as the terminal that is the source of provision of communication parameters, a request to start provision of communication parameters as a communication-start request (F403).

When processing for setting communication parameters starts, terminal B first negotiates with terminal A in regard to the encryption and authentication scheme used when data communication is performed after the setting of communication parameters (F404). As indicated in the flowchart of terminal A, in order to distinguish the encryption and authentication scheme, terminal B also adopts whether group-key share processing is executed or not executed as the criterion (F405).

Described first will be a case where a scheme for executing group-key share processing is adopted at the decision step F405.

In the case of the scheme for executing group-key share processing, it is necessary to decide in the connection authentication process which of terminals A and B is on the side that authenticates the connection and which is on the side where the connection is authenticated. Here, by virtue of the processing for deciding the direction of provision of communication parameters, terminal A decided upon as the terminal that is the providing source of communication parameters becomes the authenticator that takes charge of the function on the connection authenticating side. Terminal B or C decided upon as the terminal that is the destination of provision of communication parameters becomes the supplicant that takes charge of the function on the connection-authenticated side.

With regard to the provision of communication parameters by terminal A, encryption of the communication parameters and authentication processing between the parameter-source terminal and parameter-destination terminal are carried out. Accordingly, terminal B generates a random number necessary in order to execute encryption and authentication processing (F406).

Next, between itself and terminal A, terminal B executes encryption-key share processing and authentication processing for decrypting communication parameters with which it is provided (F407). In the course of the processing at F407, a random number generated by terminal A necessary for encryption and authentication processing at the time of provision of communication parameters is transmitted from terminal A. By using the mutually generated random numbers, terminals A and B execute encryption-key share processing for provision of communication parameters.

Thereafter, since communication parameters necessary to configure the ad-hoc-mode network are transmitted from terminal A to terminal B, terminal B receives these communication parameters (F408). It should be noted that the communication parameters have been encrypted by the encryption key shared between terminal A and terminal B at F407.

Further, a session key (generated by terminal A at F308 in FIG. 3) valid only between terminal B and terminal A is transmitted from terminal A as a communication parameter.

The session key received at F408 is an encryption key valid when unicast communication is performed between terminals A and B. Next, terminal B receives from terminal A a group key valid for all terminals that constitute the ad-hoc-mode network (F409). It should be noted that the group key has been encrypted by the session key provided by terminal A at F408. The group key is thus shared between terminals A and B.

At this point in time the communication parameters necessary for the wireless connection are complete. Accordingly, terminal B receives from terminal A notification of completion of setting of communication parameters, which serves as notification of completion of communication (F410). At this time "CONNECTION TO WIRELESS NETWORK IS COMPLETE", etc., is displayed on the display unit 105. This enhances user convenience.

Communication over the ad-hoc-mode network is established between terminals A and B by the processing described above. Accordingly, terminal B terminates the display indicating that the parameter setting function activated at F401 is valid (F411).

Described next will be a case where a scheme for executing group-key share processing is not adopted at the decision step F405.

In the case of a scheme in which group-key share processing is not executed, it will suffice if the encryption key provided from terminal A to terminal B as a communication parameter is applied as is. That is, it is not particularly necessary to decide which of terminals A and B is on the side that authenticates the connection and which is on the side where the connection is authenticated in the connection authentication process.

With regard to the provision of communication parameters by terminal A, encryption of the communication parameters and authentication processing between the parameter-source terminal and parameter-destination terminal are carried out. Here terminal B generates a random number necessary to execute this encryption and authentication processing (F412).

Next, between itself and terminal A, terminal B executes encryption-key share processing and authentication processing for decrypting the communication parameters with which it is provided (F413).

Since terminal A sends terminal B the communication parameters necessary in order to configure the ad-hoc-mode network, terminal B receives these communication parameters (F414). It should be noted that the communication parameters have been encrypted by the encryption key shared between terminals A and B at F413.

By virtue of the processing described above, communication-parameter setting processing in a case where group-key share processing is not executed is completed and the same communication parameters can be shared between terminals A and B. A network therefore can be constructed using these parameters.

Figure 5:
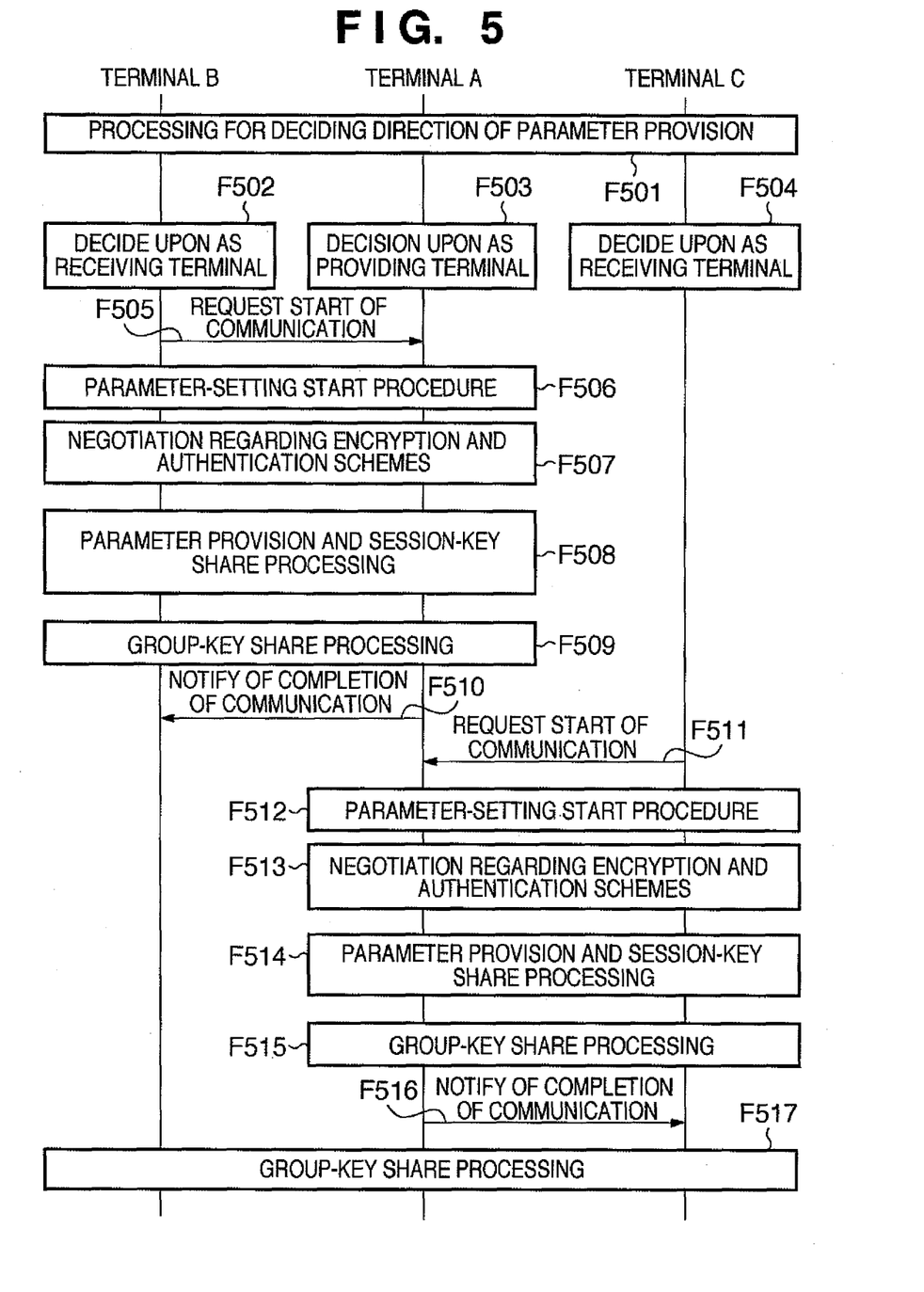
FIG. 5 is a sequence diagram illustrating a communication control method in the network configuration shown in FIG. 2.

FIG. 5 is a sequence diagram illustrating a communication control method in the network configuration shown in FIG. 2.

First, the setting button 106 on each of terminals A, B and C is pressed in order to activate the communication-parameter setting function of each terminal. By pressing the setting button 106, the communication-parameter setting function is activated and the predetermined processing for deciding the direction of provision of the communication parameters is executed (F501).

As a result of execution of the processing for deciding the direction of provision of the communication parameters, terminal A is decided upon as the communication-parameter providing terminal (F503) and terminals B and C are decided upon as the communication-parameter receiving terminals (F502, F504).

Next, a request to start provision of communication parameters serving as a communication-start request is transmitted from terminal B decided upon as the communication-parameter receiving terminal to terminal A decided upon as the communication-parameter providing terminal (F505). Next, a procedure for starting the setting of communication parameters is performed between terminals A and B (F506).

Following execution of the procedure for starting the setting of communication parameters, terminals A and B negotiate in regard to the encryption and authentication scheme used when data communication is performed after the setting of communication parameters (i.e., after construction of the network) (F507). Here processing diverges depending upon whether or not group-key share processing described above with reference to FIGS. 3 and 4 is executed.

In a case where the encryption and authentication scheme for executing group-key share processing is selected at F507, connection authentication processing and session-key share processing that normally are executed following communication-parameter setting processing are executed simultaneously during communication-parameter setting processing (F508). As a result, the time required for formation of the network can be shortened in comparison with the case where connection authentication processing and session-key share processing are executed after communication-parameter setting processing.

When the session key is decided, a group key used in multicast communication and groupcast communication in the ad-hoc-mode network is distributed from terminal A to terminal B using the session key (F509).

As a result of the above-described processing, the communication parameters necessary for the wireless connection are shared by terminals A and B and therefore terminal A sends terminal B notification of completion of setting of communication parameters, which serves as notification of completion of communication (F510). Communication parameters common to both terminals A and B are thus set and the ad-hoc-mode network is established.

Next, reference will be made to FIG. 5 to describe a case where, following the completion of setting of communication parameters and construction of a new network between terminals A and B, terminal C joins the network.

First, since terminal C has already been decided upon as a communication-parameter receiving terminal at F504 described above, a request to start provision of communication parameters serving as a communication-start request is transmitted from terminal C decided upon as the communication-parameter receiving terminal to terminal A decided upon as the communication-parameter providing terminal (F511). Next, a procedure for starting the setting of communication parameters is performed between terminals A and C (F512).

Following execution of the procedure for starting the setting of communication parameters, terminals A and C negotiate in regard to the encryption and authentication scheme used when data communication is performed after the setting of communication parameters (i.e., after construction of the network) (F513). Here processing diverges depending upon whether or not group-key share processing described above with reference to FIGS. 3 and 4 is executed.

A case where the encryption and authentication scheme for executing group-key share processing is selected in F513 will be described. In this case, connection authentication processing and session-key share processing that normally are executed following communication-parameter setting processing are executed simultaneously during communication-parameter setting processing (F514). As a result, the time required for formation of the network can be shortened in comparison with the case where connection authentication processing and session-key share processing are executed after communication-parameter setting processing.

When the session key is decided, a group key used in multicast communication and groupcast communication in the ad-hoc-mode network is distributed from terminal A to terminal C using the session key (F515).

As a result of the above-described processing, the communication parameters necessary for the wireless connection are shared by terminals A and C and therefore terminal A sends terminal C notification of completion of setting of communication parameters (F516) and terminal C joins the ad-hoc-mode network that has been constructed by terminals A and B.

If the group key used in common by the terminals within the network is always the same, it may be possible for a malicious third party or for a terminal that participated in the network in the past to readily join the network. This is a security hazard. Accordingly, the group key may be updated by a periodic timer or whenever there is an increase or decrease in terminals that receive the communication parameters.

In the example shown in FIG. 5, terminal A shares the group key with terminals B and C at the moment terminal C joins the network anew (F517). Since the group key is thus updated by executing group-key share processing when there is an increase or decrease in terminals within the network, security can be enhanced.

Thus, in this embodiment, the roles played in session-key share processing (whether a terminal is on the authenticator side or supplicant side) is decided in accordance with discrimination of the role in communication-parameter setting processing (whether a terminal is the terminal that is the source of provision of communication parameters or a terminal that is the destination of the provided parameters). As a result, session-key share processing which normally is required to be executed after communication-parameter setting processing can be executed during communication-parameter setting processing. This makes it possible to shorten the time needed to complete the connection. Further, owing to the fact that the terminal that is the source of provision of communication parameters becomes the terminal on the authenticator side, the updating of the group key can be performed with ease and security is enhanced.

Second Embodiment

Next, a second embodiment according to the present invention will be described in detail with reference to the drawings. Described in the first embodiment are the setting of communication parameters by terminal A and terminal B or C and the completion of the connection. Described in the second embodiment is re-connection in a case where terminal A and terminal B or C have already completed the setting of communication parameters.

The hardware configuration in the second embodiment is similar to that shown in FIG. 1 used in the first embodiment. Further, the example of the network configuration in the second embodiment also is similar to that of FIG. 2 used in the first embodiment. The processing up to formation of the network between terminal A and terminals B and C is similar to that of the first embodiment and need not be described again.

Figure 6:
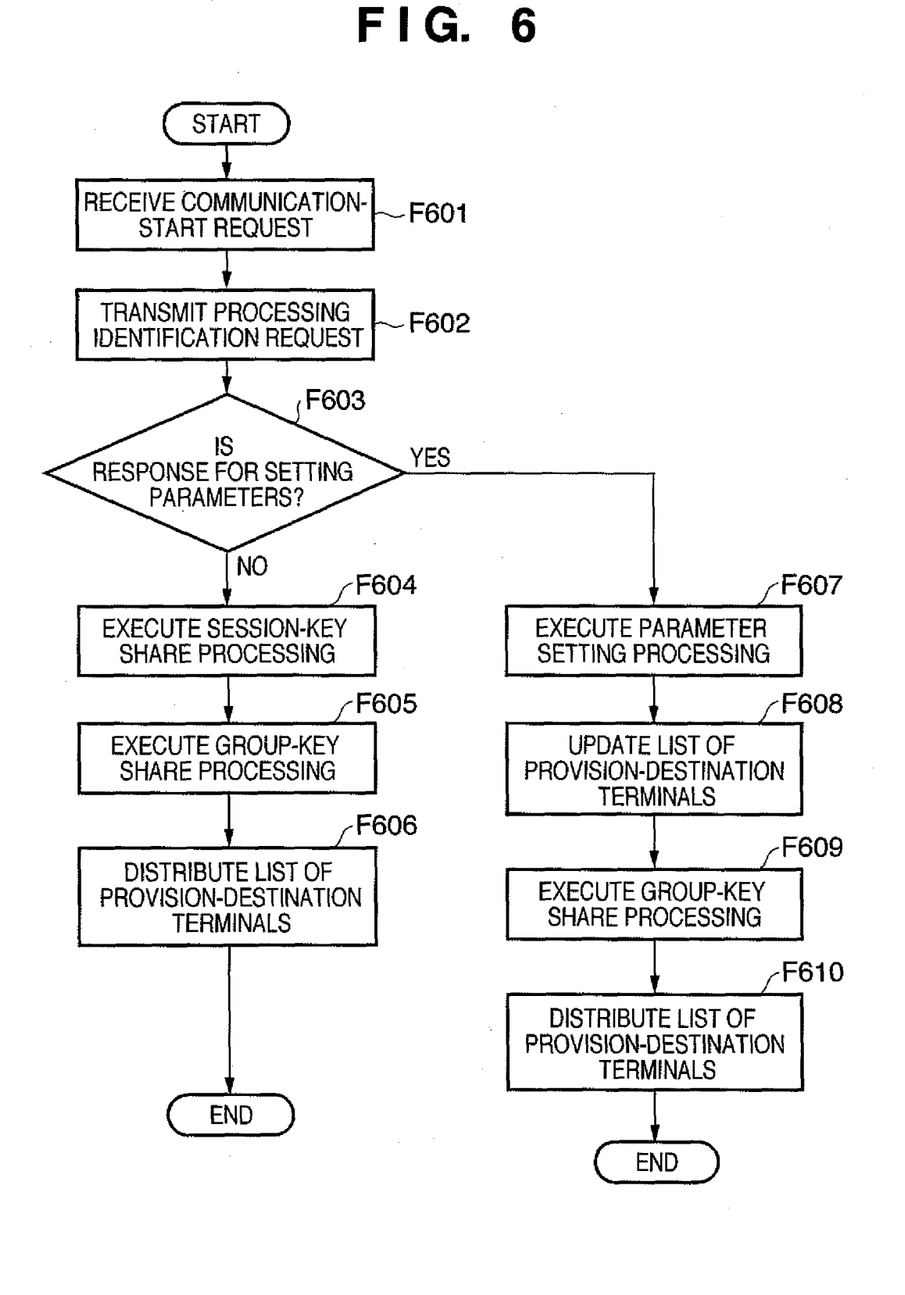
FIG. 6 is a flowchart useful in describing a method of controlling communication of terminal A in FIG. 2 in a second embodiment of the present invention.

FIG. 6 is a flowchart useful in describing a method of controlling communication of terminal A in FIG. 2 according to the second embodiment. First, terminal A, which is the terminal that is the source of provision of communication parameters receives a communication-start request from terminal B, which is the terminal at the destination provided with the communication parameters (F601). It is assumed that this communication-start request is used not only in communication-parameter setting processing but also in ordinary connection authentication processing. Upon receiving the communication-start request, terminal A sends a processing identification request to the source of the transmission in order to determine whether start of communication-parameter setting processing has been requested or whether start of connection authentication processing has been requested (F602).

In response to the processing identification request, terminal B sends back a processing identification response. Processing branches depending upon whether the type of response is that for setting parameters or not (F603).

Next, a case where the processing-type response indicates ordinary connection authentication processing will be described.

First, in the case of ordinary connection authentication processing, terminal A that was the source of transmission of the communication parameters authenticates terminal B by serving as the authenticator that takes charge of the function on the connection authentication side (F604).

Following session-key share processing, terminal A executes processing for sharing a group key, which is used at the time of multicast communication or broadcast communication, between itself and all terminals that participate in the ad-hoc-mode network (F605). Since a case where there has been an increase in terminals newly provided with communication parameters by terminal A is also conceivable, terminal A distributes a list of provision-destination terminals to terminals that terminal A has provided with communication parameters thus far (F606). The list is used when the terminal that is to take charge of the function on the connection authentication side is decided after terminal A has left the network.

Described next will be case where the processing-type response indicates that it is for setting of communication parameters in F603. In this case, communication-parameter setting processing already described with reference to FIG. 3 is executed (F607).

Next, at the moment the setting of communication parameters ends, the above-mentioned list of provision destination terminals that have been provided with communication parameters is updated (F608). Thereafter, terminal A executes group-key share processing between itself and all terminals that participate in the network (F609) and distributes the updated list to each of the terminals (F610).

As a result of the foregoing operation, the group key is updated at all terminals that constitute the ad-hoc-mode network and information concerning each terminal can be retained. Further, "CONNECTION TO WIRELESS NETWORK IS COMPLETE", etc., may be displayed on the display unit 105 to enhance user convenience.

Figure 7:
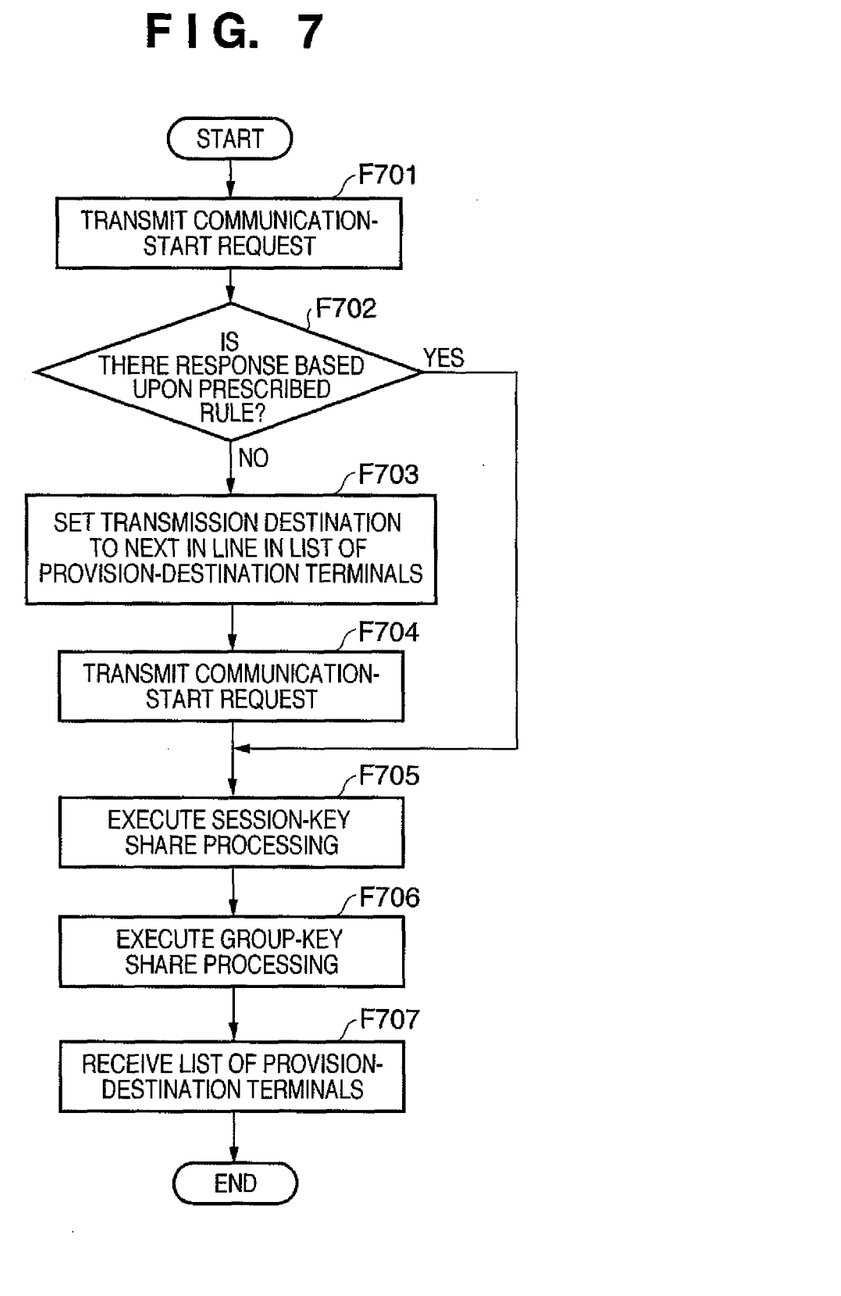
FIG. 7 is a flowchart useful in describing a method of controlling communication of terminal B or C in FIG. 2 in the second embodiment.

FIG. 7 is a flowchart useful in describing a method of controlling communication of terminal B or C in FIG. 2 in the second embodiment. Here the method in the case of terminal B will be described.

Terminal B, which is the terminal that receives communication parameters, transmits a communication-start request to terminal A, which is the source of provision of communication parameters (F701). This communication-start request is used not only in communication-parameter setting processing but also in ordinary connection authentication processing. In order to determine whether start of communication-parameter setting processing has been requested or whether start of connection authentication processing has been requested, terminal B receives a processing identification request from terminal A, which has received the communication-start request.

It should be noted that there is also a case where terminal A, which was the source of provision of communication parameters, no longer exists on the network. In this case, whether terminal A exists on the network is determined by expiration of a fixed period of time or by performing retry (re-transmission) a prescribed number of times (F702).

If there is no response from terminal A, it is determined that terminal A no longer exists on the network. Terminal B refers to the list of communication-parameter provision-destination terminals received from terminal A and selects a transmission destination for the communication-start request. For example, a terminal D is set as the new connection destination (F703).

Terminal B then transmits the communication-start request to terminal D, which is the selected destination for transmission of the communication-start request (F704). Terminal B then waits for receipt of the processing identification request from terminal D, which has received the communication-start request. If terminal D also no longer exists, then terminal. B again selects a terminal from the list of communication-parameter provision-destination terminals and transmits the communication-start request. Processing thus continues until the processing identification request is received or until the list is emptied.

Since the processing does not change depending upon the source that receives the processing identification request, here the description will be rendered on the assumption that the processing identification request has been received from terminal A.

As a response to the processing identification request, terminal B responds to the effect that processing is the order connection authentication processing. In this case, terminal A authenticates terminal B by serving as the authenticator that takes charge of the function on the connection authentication side (F705). Following session-key share processing, terminal B executes processing for sharing a group key, which is used at the time of multicast communication or broadcast communication, between itself and the entire ad-hoc-mode network (F706).

Since a case where there has been an increase in terminals newly provided with communication parameters by terminal A is also conceivable, terminal B receives a list of provision-destination terminals from terminal A (F707).

As a result of the foregoing operation, the group key is updated at all terminals that constitute the ad-hoc-mode network and information concerning each terminal can be retained. Further, "CONNECTION TO WIRELESS NETWORK IS COMPLETE", etc., may be displayed on the display unit 105 at this time to enhance user convenience.

Thus, owing to the fact that the communication-parameter provider terminal (the authentication side) distributes a list of provision-destination terminals to the terminals within the network, a new authentication-side terminal can be decided even if the provision-destination terminals have left the network.

Further, although a wireless LAN system compliant with the IEEE 802.11 standard has been described as an example, it goes without saying that the form of communication is not limited to an IEEE 802.11-compliant wireless LAN.

Further, it goes without saying that the object of the invention is attained also by supplying a recording medium storing the program codes of the software for performing the functions of the foregoing embodiments to a system or an apparatus, reading the program codes with a computer (e.g., a CPU or MPU) of the system or apparatus from the recording medium, and then executing the program codes.

In this case, the program codes per se read from the recording medium implement the novel functions of the embodiments and the recording medium storing the program codes constitutes the invention.

Examples of recording media that can be used for supplying the program code are a flexible disk, hard disk, optical disk, magneto-optical disk, CD-ROM, CD-R, magnetic tape, non-volatile type memory card or ROM, etc.

Further, not only are the functions of the above-described embodiments implemented by executing program code that has been read by a computer; the following case is included as well. Specifically, an operating system or the like running on the computer executes some or all of the actual processing based upon the indications in the program codes, and the functions of the above-described embodiments are implemented by this processing.

Furthermore, it goes without saying that the following case also is included in the present invention: Specifically, program code read from a recording medium is written to a memory provided on a function expansion board inserted into the computer or provided in a function expansion unit connected to the computer. Thereafter, a CPU or the like provided on the function expansion board or function expansion unit performs some or all of actual processing based upon the indication in the program codes, and the functions of the above embodiments are implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-068354, filed Mar. 17, 2008, which is hereby incorporated by reference herein in its entirety.

The invention claimed is:

1. A communication apparatus, comprising:
a decision unit configured to decide, using a prescribed protocol, a role of the communication apparatus in a communication network formed between the communication apparatus and another communication apparatus;
a providing unit configured to provide, in a case where the decision unit decides that the role of the communication apparatus is a first role, the other communication apparatus with communication parameters for forming a communication network,
a receiving unit configured to receive, in a case where the decision unit decides that the role of the communication apparatus is a second role, communication parameters for forming a communication network;
an authenticator unit configured to function as an authenticating side apparatus for authenticating the other communication apparatus in the case where the decision unit decides that the role of the communication apparatus is the first role; and
an authenticatee unit configured to function as an authenticated side apparatus for being authenticated by the other communication apparatus in the case where the decision unit decides that the role of the communication apparatus is the second role;
wherein decision of the role of the communication apparatus using the prescribed protocol by the decision unit is omitted and the authenticator unit re-executes an authentication process with the other communication apparatus as the authenticating side apparatus in accordance with the role decided using the prescribed protocol by the decision unit during a previous connection and executes a sharing process for sharing an encryption key used for performing encrypted communication in the communication network, in a case where the other communication apparatus re-connects to the communication network formed based on the communication parameters provided by the providing unit after the other communication apparatus has left the communication network, and
wherein the decision unit, the providing unit, the receiving unit, the authenticator unit and the authenticatee unit are implemented by at least one processor.

2. The apparatus according to claim 1, wherein negotiation regarding an encryption scheme, which is used when data communication is performed after setting of communication parameters, is carried out with the other communication apparatus, and whether the authentication is carried out is determined based upon a result of the negotiation.

3. The apparatus according to claim 2, wherein in a case where the result of negotiation is that it has been determined to use an encryption scheme for executing share processing of the same group key in all communication apparatuses that constitute the network, the authentication is carried out, and in a case where the result of the negotiation is that it has been determined to use an encryption scheme that does not employ the group key, the authentication is not carried out.

4. The apparatus according to claim 3, wherein the group key is updated periodically after construction of a network using the communication parameters.

5. The apparatus according to claim 3, wherein the group key is updated in accordance with a change in number of communication apparatuses that participate in the network, the update being performed after construction of a network using the communication parameters.

6. The apparatus according to claim 1, further comprising a distribution unit configured to, in a case where the providing unit provides the communication parameters, distributes a list of destination apparatuses of provision of the communication parameters.

7. The apparatus according to claim 1, further comprising:
a list receiving unit configured to, in a case where the decision unit does not decide that the role of the communication apparatus is the first role, receive a list of destination apparatuses to which the other communication apparatus has already provided the communication parameters, the list being distributed from the other communication apparatus,
wherein an apparatus that performs an authentication process is selected based on the received list.

8. The apparatus according to claim 1, further comprising:
a signal receiving unit configured to receive a start signal;
a determination unit configured to determine a process corresponding to the start signal; and
a selection unit configured to select a process in response to the determination of the determination unit.

9. The apparatus according to claim 8, wherein, in response to the selection in the selection unit, one of the followings is performed: (1) performing an authentication process without performing a process for sharing communication parameters; and (2) performing an authentication process after performing a process for sharing communication parameters.

10. The apparatus according to claim 1, wherein, when the other communication apparatus re-connects to the communication network formed based on the communication parameters provided by the providing unit after the other communication apparatus has left the communication network, the authenticator unit performs, as the authenticating side apparatus, the authentication process with the other communication apparatus even if the providing unit does not provide the communication parameters.

11. A control method of a communication apparatus comprising:
using at least one processor to perform the steps of:
deciding, using a prescribed protocol, a role of the communication apparatus in a communication network formed between the communication apparatus and another communication apparatus;
providing, in a case where it is decided in the decision step that the role of the communication apparatus is a first role, the other communication apparatus with communication parameters for forming a communication network,
receiving, in a case where it is decided in the decision step that the role of the communication apparatus is a second role, communication parameters for forming a communication network;
functioning as an authenticating side apparatus for authenticating the other communication apparatus in the case where it is decided in the decision step that the role of the communication apparatus is the first role; and
functioning as an authenticated side apparatus for being authenticated by the other communication apparatus in the case where it is decided in the decision step that the role of the communication apparatus is the second role;
wherein decision of the role of the communication apparatus using the prescribed protocol in the step of the deciding is omitted, and in the step of functioning as the authenticating side apparatus, an authentication process with the other communication apparatus is re-executed as the authenticating side apparatus in accordance with the role decided using the prescribed protocol in the step of deciding during a previous connection and a sharing process for sharing an encryption key used for performing encrypted communication in the communication network is performed, in a case where the other communication apparatus re-connects to the communication network formed based on the communication parameters provided in the providing step after the other communication apparatus has left the communication network.

12. A non-transitory computer-readable storage medium on which is stored a program for causing a computer to execute the processing method according to claim 11.

* * * * *